United States Patent
Merkel

(10) Patent No.: US 9,457,755 B2
(45) Date of Patent: Oct. 4, 2016

(54) ONE PIECE INSTRUMENT PANEL WITH MOLDED UPPER BIN

(71) Applicant: Toyota Motor Engineering & Manufacturing North America, Inc., Erlanger, KY (US)

(72) Inventor: Nicholas Earl Merkel, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/601,688

(22) Filed: Jan. 21, 2015

(65) Prior Publication Data

US 2016/0200277 A1    Jul. 14, 2016

Related U.S. Application Data

(60) Provisional application No. 62/101,529, filed on Jan. 9, 2015.

(51) Int. Cl.
| | |
|---|---|
| *B60R 21/045* | (2006.01) |
| *B62D 25/14* | (2006.01) |
| *B60R 7/06* | (2006.01) |
| *B60R 21/04* | (2006.01) |

(52) U.S. Cl.
CPC ............. *B60R 21/045* (2013.01); *B60R 7/06* (2013.01); *B62D 25/145* (2013.01); *B60R 2021/0414* (2013.01)

(58) Field of Classification Search
CPC .................. B60R 21/045; B60R 7/06; B60R 2021/0414; B62D 25/145
See application file for complete search history.

(56) References Cited

U.S. PATENT DOCUMENTS

| | | | | |
|---|---|---|---|---|
| 4,709,943 A * | 12/1987 | Yoshimura | ............ | B60R 21/045 180/90 |
| 5,085,465 A * | 2/1992 | Hieahim | ................ | B60R 21/30 280/738 |
| 5,190,314 A * | 3/1993 | Takasugi | ................... | B60R 7/06 280/730.1 |
| 5,482,319 A * | 1/1996 | Yoshimura | ............ | B60R 21/045 280/752 |
| 5,639,116 A * | 6/1997 | Shimizu | ................ | B60R 21/205 180/90 |
| 5,865,468 A * | 2/1999 | Hur | ........................ | B60R 21/045 188/377 |
| 6,176,544 B1 * | 1/2001 | Seksaria | ................ | B60R 21/045 280/752 |
| 6,213,504 B1 * | 4/2001 | Isano | ..................... | B60R 21/045 280/748 |
| 6,299,208 B1 * | 10/2001 | Kasahara | .................. | B60R 7/06 280/748 |
| 6,550,835 B2 * | 4/2003 | Davis, Jr. | ............... | B60K 37/00 296/37.12 |
| 6,869,123 B2 | 3/2005 | Marks et al. | | |
| 6,896,308 B2 * | 5/2005 | Okanda | ................. | B60R 21/045 280/752 |
| 7,040,686 B2 * | 5/2006 | Kapteyn | ................. | B60K 35/00 248/27.3 |
| 7,201,434 B1 | 4/2007 | Michalak et al. | | |
| 7,290,788 B2 * | 11/2007 | Tomford | ............... | B60R 21/217 280/728.2 |

(Continued)

*Primary Examiner* — Drew Brown
*Assistant Examiner* — Timothy Wilhelm
(74) *Attorney, Agent, or Firm* — Dinsmore & Shohl LLP

(57) ABSTRACT

An instrument panel and energy absorbing system for a vehicle includes an instrument panel reinforcement extending from a passenger side to a driver side of a vehicle. At least one bracket is secured to the instrument panel reinforcement. A one piece instrument panel includes an open bin structure formed thereon. An opening is formed in the instrument panel and receives a glove box structure. A trim panel is connected to the instrument panel about the opening and open bin structure. When an impact force is applied to the glove box, the glove box travels along a path from an unengaged position to an engaged position wherein the trim panel contacts the at least one bracket to absorb at least a portion of the impact force, when the glove box is in the engaged position.

17 Claims, 6 Drawing Sheets

(56) References Cited

U.S. PATENT DOCUMENTS

| | | | |
|---|---|---|---|
| 7,311,328 B2 | 12/2007 | Best et al. | |
| 7,484,792 B2* | 2/2009 | Penner | B60R 7/06 280/752 |
| 7,703,829 B2* | 4/2010 | Miki | B60R 21/045 280/748 |
| 7,731,261 B2* | 6/2010 | Wenzel | B29C 45/006 180/90 |
| 7,735,866 B2* | 6/2010 | Clashman | B60R 7/06 280/752 |
| 7,810,837 B2* | 10/2010 | Thomas | B60R 21/16 280/730.1 |
| 7,810,869 B2 | 10/2010 | Taracko | |
| 7,874,587 B2* | 1/2011 | Miki | B60R 7/06 280/752 |
| 7,946,640 B2* | 5/2011 | Sato | B29C 44/1233 180/90 |
| 8,251,399 B2* | 8/2012 | Babian | B60R 7/06 280/752 |
| 8,262,131 B2 | 9/2012 | Misikir et al. | |
| 8,308,186 B1* | 11/2012 | Orlowsky | B60R 21/04 280/728.2 |
| 8,403,392 B2* | 3/2013 | Okimoto | B60R 7/06 292/121 |
| 8,424,207 B2* | 4/2013 | Nakano | B22C 9/22 164/129 |
| 8,434,810 B2* | 5/2013 | Masada | B60R 7/06 280/752 |
| 8,668,238 B2* | 3/2014 | Kuwano | B60R 7/06 224/483 |
| 2014/0103685 A1* | 4/2014 | Mani | B62D 25/145 296/193.02 |

* cited by examiner

ONE PIECE INSTRUMENT PANEL WITH MOLDED UPPER BIN

CROSS REFERENCE TO RELATED APPLICATION(S)

This application claims the priority of U.S. Provisional Application No. 62/101,529 filed Jan. 9, 2015, which is incorporated herein in its entirety by reference.

FIELD OF THE INVENTION

The invention relates to instrument panels for a vehicle and with more particularity to instrument panels that include energy absorption systems.

BACKGROUND OF THE INVENTION

Vehicles generally contain instrument panels located in front of the driver's and passenger's seats. The instrument panel may contain a variety of components including HVAC accessories, airbags, glove box assemblies and the like. The instrument panel and components may generally be attached to an instrument panel reinforcement (IPR) such that the IPR supports both the instrument panel and the various components contained in the instrument panel. The IPR may also serve as an attachment point for various structural members.

Prior art instrument panels are generally formed in multiple pieces and may be connected together. There is therefore a need in the art for a simplified structure that is made of one piece that is costly to manufacture and allows a simplified installation.

Instrument panels may include various storage structures including a glove box. It is desirable to include additional storage locations on an instrument panel. There is therefore a need in the art for a one piece instrument panel that includes additional storage structures such as an open bin.

In the event that the vehicle is involved in a collision, it is possible that a person seated in the vehicle, especially a person in the position nearest to and facing the instrument panel will come into physical contact with the instrument panel. Accordingly, a need exists for energy absorption systems associated with the instrument panel and the IPR to absorb the energy of a passenger in the event of a collision.

SUMMARY OF THE INVENTION

In one aspect, there is disclosed an instrument panel and energy absorbing system for a vehicle that includes an instrument panel reinforcement extending from a passenger side to a driver side of a vehicle. At least one bracket is secured to the instrument panel reinforcement. A one piece instrument panel includes an open bin structure formed thereon. An opening is formed in the instrument panel and receives a glove box structure. A trim panel is connected to the instrument panel about the opening and open bin structure. When an impact force is applied to the glove box, the glove box travels along a path from an unengaged position to an engaged position. The glove box contacts the trim panel transferring at least a portion of the impact force to the trim panel and wherein the trim panel contacts the at least one bracket to absorb at least a portion of the impact force, when the glove box is in the engaged position.

In another aspect, there is disclosed an instrument panel and energy absorbing system for a vehicle that includes an instrument panel reinforcement extending from a passenger side to a driver side of a vehicle. At least one bracket is secured to the instrument panel reinforcement. A one piece instrument panel includes an open bin structure formed thereon. An opening is formed in the instrument panel and receives a glove box structure. A trim panel is connected to the instrument panel about the opening and open bin structure. When an impact force is applied to the glove box, the glove box travels along a path from an unengaged position to an engaged position. When the impact force is applied to the glove box at least a portion of the impact force is transferred through the trim panel and fastener to the instrument panel and through the open bin and fastener to the bracket.

In a further aspect, there is disclosed there is disclosed an instrument panel and energy absorbing system for a vehicle that includes an instrument panel reinforcement extending from a passenger side to a driver side of a vehicle. At least one bracket is secured to the instrument panel reinforcement. A one piece instrument panel includes an open bin structure formed thereon. An opening is formed in the instrument panel and receives a glove box structure. A trim panel is connected to the instrument panel about the opening and open bin structure. When an impact force is applied to the glove box, the glove box travels along a path from an unengaged position to an engaged position. When the impact force is applied to the glove box at least a portion of the impact force is transferred through the at least one trim panel rib to the instrument panel and at least a portion of the impact force is transferred through the at least one instrument panel rib to the bracket.

DETAILED DESCRIPTION OF THE PREFERRED EMBODIMENTS

Figure 1:
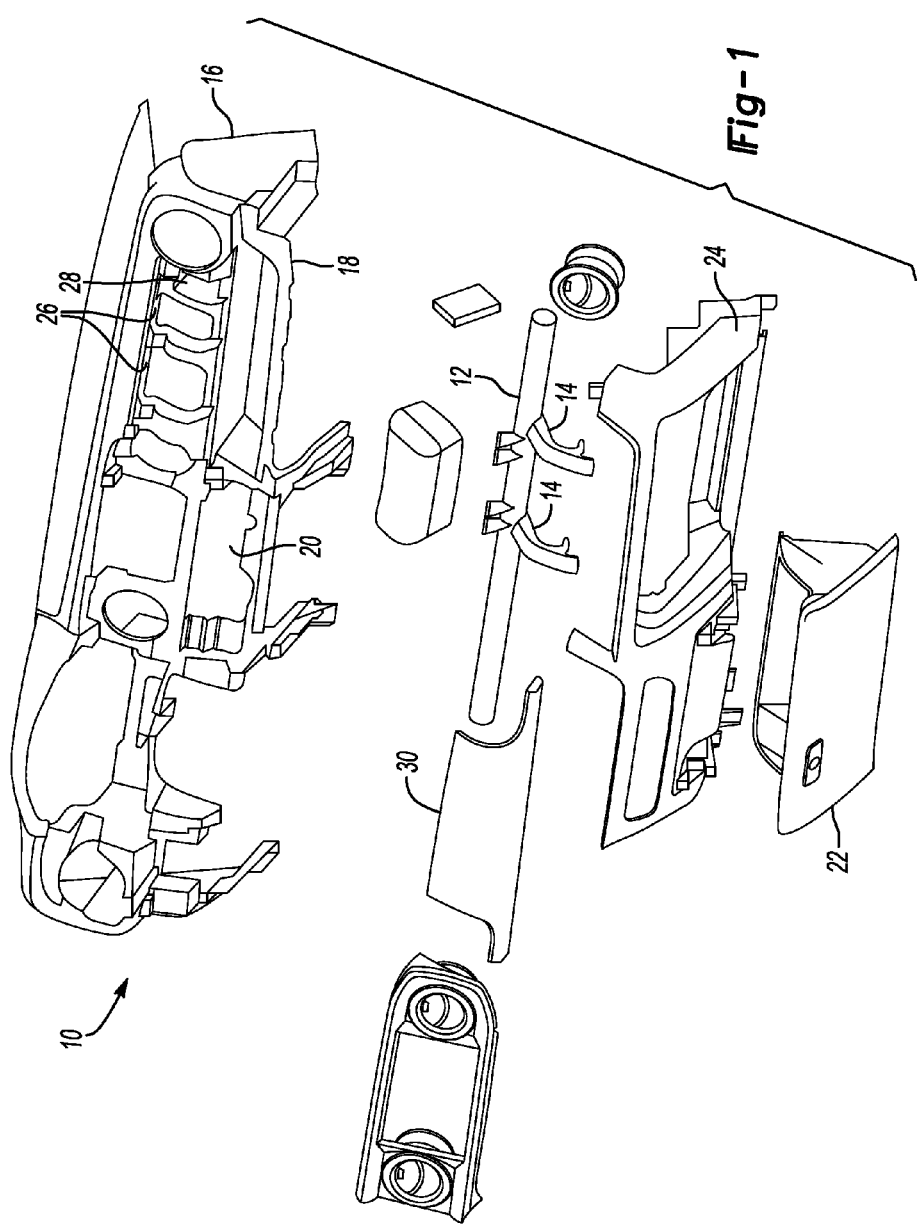
FIG. 1 is an exploded perspective view of an instrument panel including a glove box, IPR and a lower trim panel.
Figure 2:
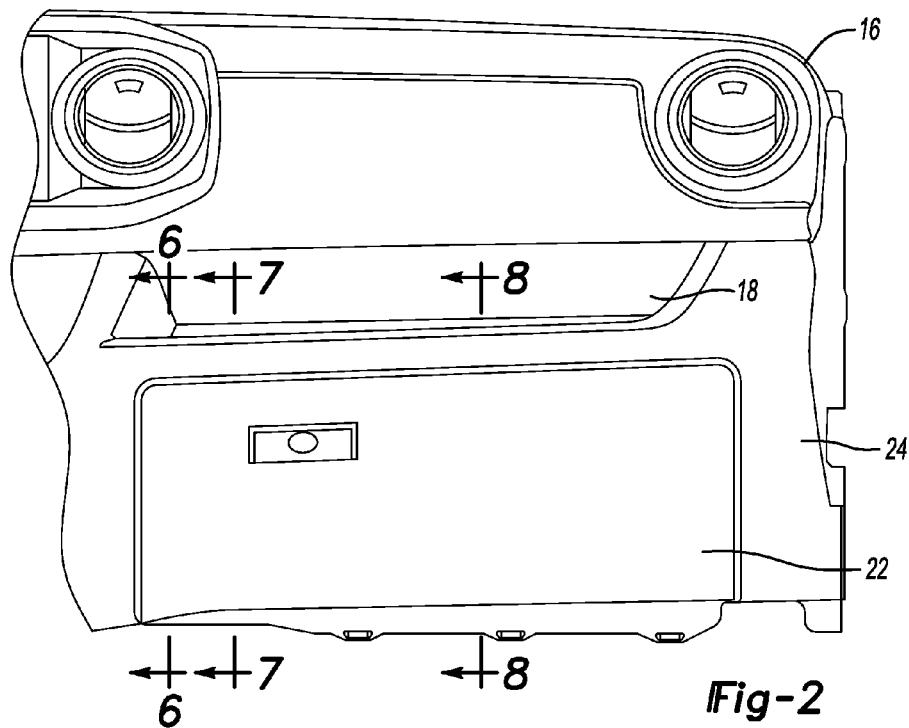
FIG. 2 is a partial front view of an instrument panel including an open bin, glove box, IPR and a lower trim panel.
Figure 3:
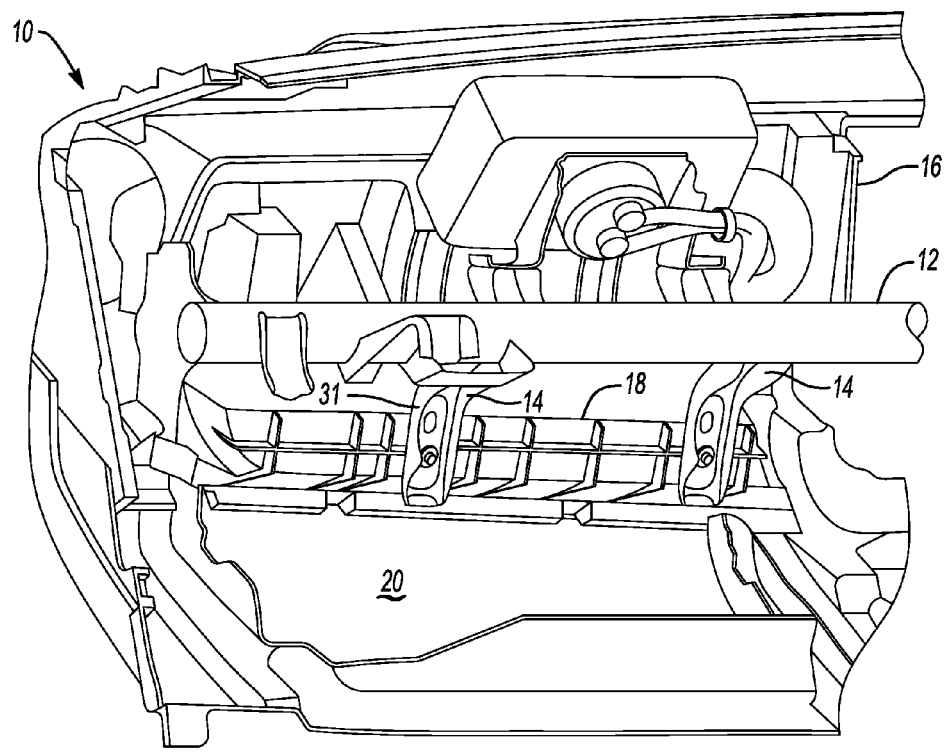
FIG. 3 is a partial rear view of an instrument panel including a glove box, IPR and a lower trim panel.

The embodiments described herein generally relate to systems within a vehicle associated with the instrument panel for absorbing energy from a passenger coming into contact with the instrument panel in the event of a collision. The energy absorption systems generally include instrument panel reinforcements, trim panels, and instrument panels or instrument panel assemblies. Energy absorption systems and related components will be described in more detail herein.

Referring to FIGS. 1-8, embodiments of energy absorption systems 10 are illustrated. An energy absorption system 10 includes instrument panel reinforcement (IPR) 12 and at least one bracket 14 secured to the instrument panel reinforcement 12. The energy absorbing system 10 also includes a one piece instrument panel 16 that has an open bin structure 18 formed thereon. An opening 20 is formed in the instrument panel 16 and receives a glove box structure 22. A trim panel 24 is connected to the instrument panel 16 about the opening 20 and open bin structure 18. When an impact force is applied to the glove box 22, the glove box 22 travels along a path from an unengaged position to an engaged position and the glove box 22 contacts the trim panel 24 transferring at least a portion of the impact force to the trim panel 24. The trim panel 24 in turn contacts the at least one bracket 14 to absorb at least a portion of the impact force, when the glove box 22 is in the engaged position.

In the embodiments described herein, the IPR 12 can extend from the passenger side of the vehicle to the driver side of the vehicle and can be formed of any metal, for example, steel. The IPR 12 can anchor a number of brackets 14 with two shown in the figures. The IPR may also anchor or connect to various components associated with the instrument panel assembly such as meters, gauges, audio and video accessories, HVAC accessories, airbags, and the like.

The at least one bracket 14 may include a curved body 31 that absorbs energy through a controlled deformation. The body 31 may include a curve that extends downward to contact various structures as will be described in more detail below.

Figure 4:
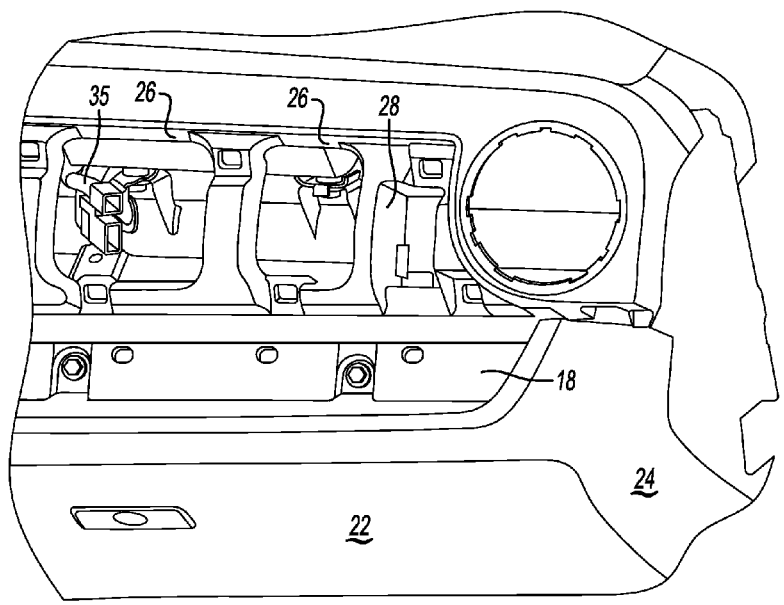
FIG. 4 is a partial front view of an instrument panel including an open bin, glove box, IPR and a lower trim panel.
Figure 5:
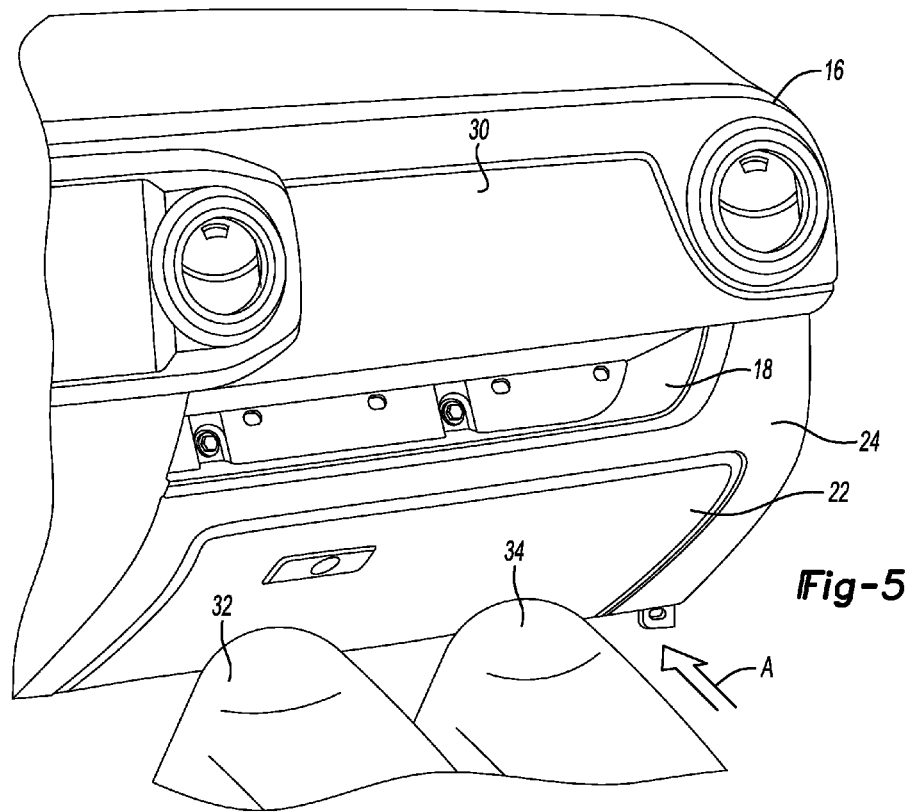
FIG. 5 is a partial rear view of an instrument panel including an open bin, decorative trim, glove box and a lower trim panel.

The instrument panel 16 may be formed in one piece to reduce the complexity and weight of the component and to allow cost effective manufacture and a simplified installation. The instrument panel 16 includes at least one access window 26 formed therein allowing connection of components on a rear side of the instrument panel 16. The open bin 18 shape may complicate the assembly of various components on a rear side of the instrument panel 16. The access window 26 may be utilized to connected wire harnesses and modules 35, as best shown in FIG. 4.

The instrument panel 16 may include a box structure 28 formed therein that is positioned adjacent the at least one access window 26. The box structure 28 may receive an electronic control unit and provide a convenient attachment point not requiring a blind assembly. The instrument panel 16 may also include a decorative trim panel 30 disposed over the at least one access window 26 and the box structure 28.

The energy absorption system 10 may include multiple energy transfer paths that allow for the controlled dissipation of an impact force in the general direction as indicated by the direction arrow A. In one aspect, upon a determined forward impact event corresponding to an occupant's knees 32 and 34 contacting the glove box 22 in a direction generally referenced by arrow A, these forces are transferred and absorbed as will be discussed in more detail below.

Figure 6:
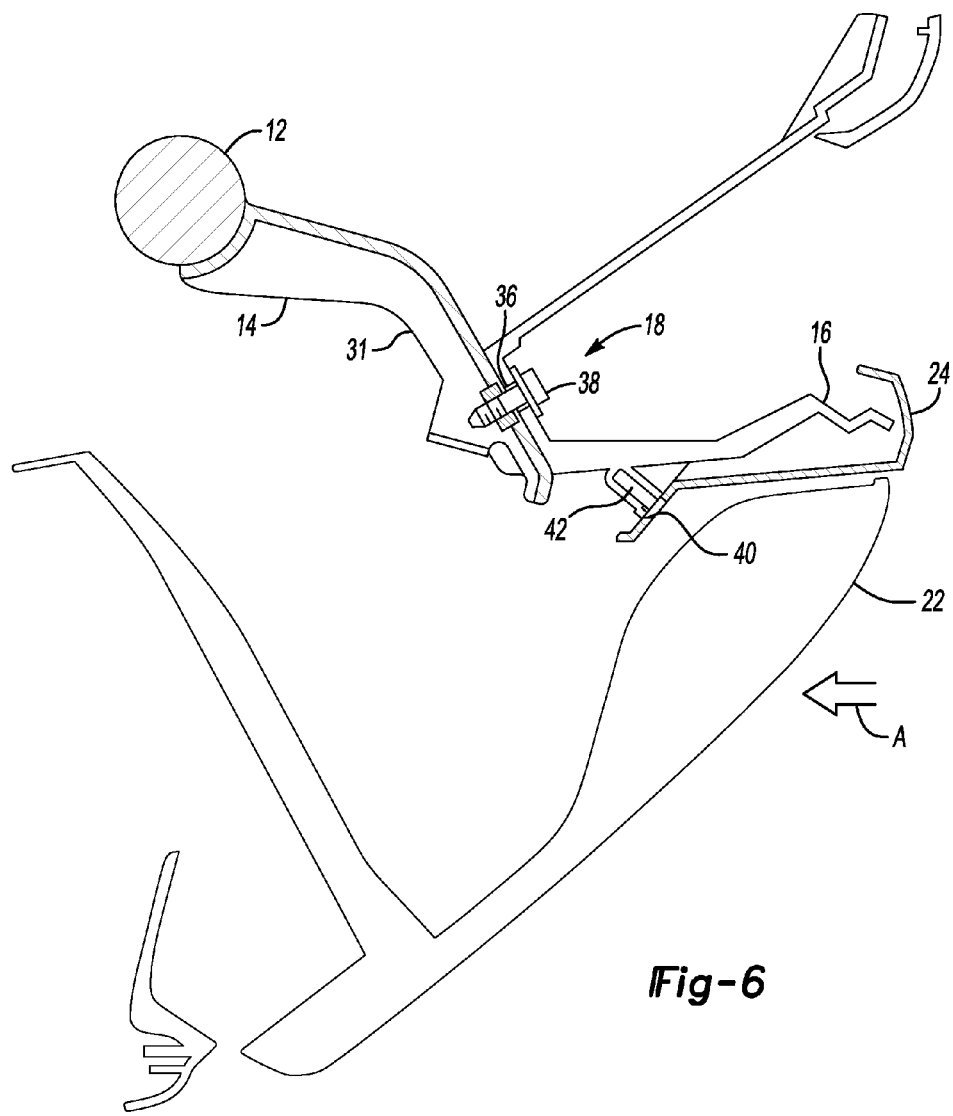
FIG. 6 is a partial section view taken along the line A-A detailing the instrument panel, glove box, bracket, IPR and lower trim panel.

Referring to FIG. 6 there is shown a sectional view of the instrument panel 16, open bin 18, trim panel 24, glove box 22 and the IPR 12. A first transfer and absorption path for the impact force includes the open bin structure 18 having a slot 36 formed therein receiving a fastener 38 connecting the open bin structure 18 to the bracket 14. When the impact force is applied to the glove box 22 at least a portion of the impact force is transferred through the open bin 18 and fastener 38 to the bracket 14 which provides a controlled absorption of the force.

Referring to FIG. 6, a second transfer and absorption path for the impact force includes the trim panel 24 having a slot 40 formed therein receiving a fastener 42 connecting the trim panel 24 to the instrument panel 16. When the impact force is applied to the glove box 22 at least a portion of the impact force is transferred through the trim panel 24 and fastener 42 to the instrument panel 16.

Figure 7:
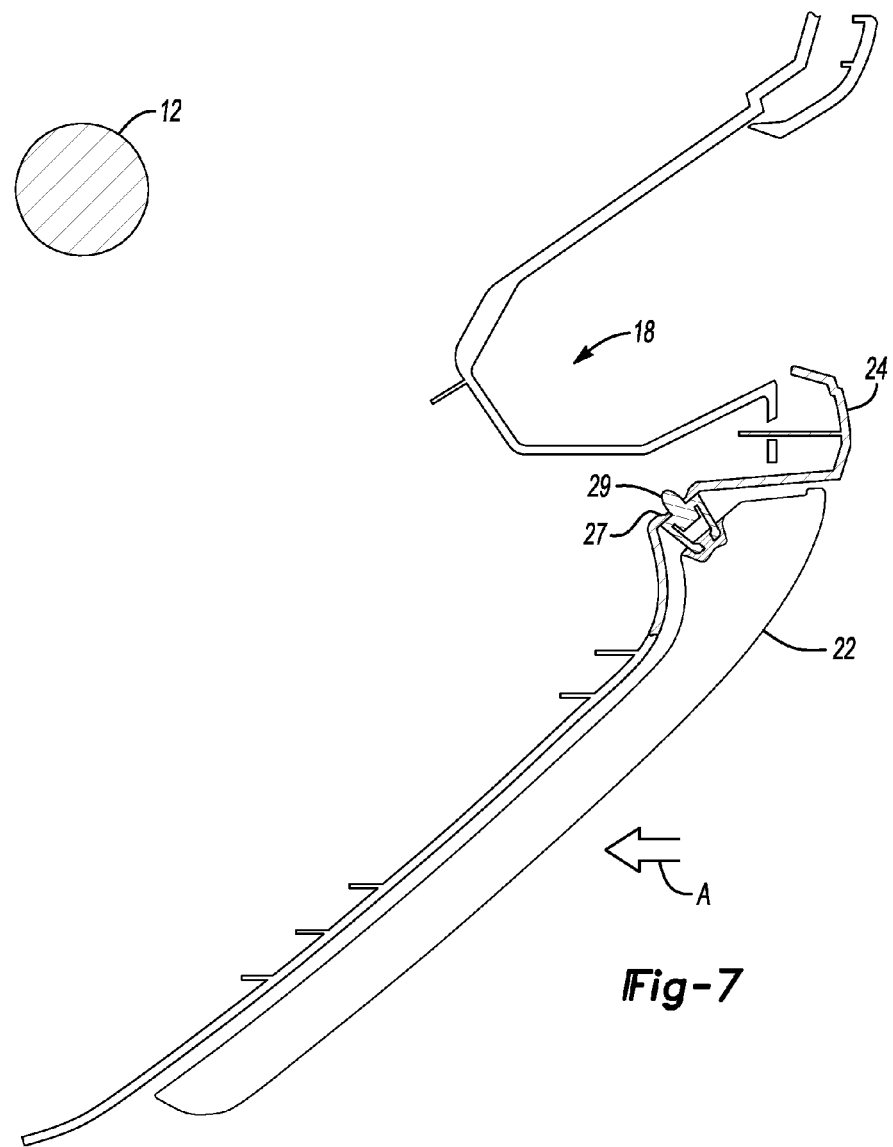
FIG. 7 is a partial section view taken along the line B-B detailing the instrument panel, glove box, bracket, IPR and lower trim panel.

Referring to FIG. 7, a third transfer and absorption path for the impact force includes the trim panel 24 having a slot 27 formed therein. The slot 27 receives a fastener 29 from the glove box 22 connecting the glove box 22 and trim panel 24. When the impact force is applied to the glove box 22 at least a portion of the impact force is transferred to the trim panel 24.

Figure 8:
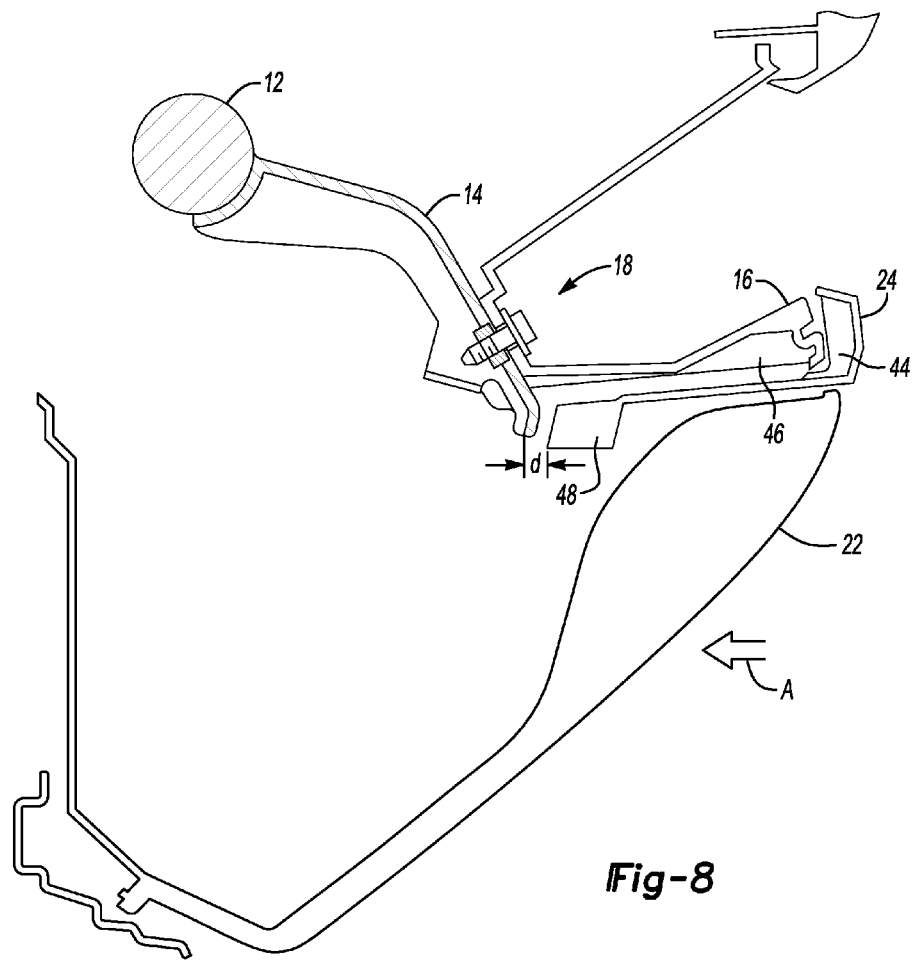
FIG. 8 is a partial section view taken along the line C-C detailing the instrument panel, glove box, bracket, IPR and lower trim panel.

Referring to FIG. 8, a fourth transfer and absorption path for the impact force includes the instrument panel 16 having at least one rib 46 formed thereon. When the impact force is applied to the glove box 22 at least a portion of the impact force is transferred through the at least one instrument panel rib 46 to the bracket 14.

Referring to FIG. 8, a fifth transfer and absorption path for the impact force includes the glove box 22 which travels along a path from an unengaged position to an engaged position. The glove box 22 contacts the trim panel 24 transferring at least a portion of the impact force to the trim panel 24. The trim panel 24 includes a contact structure 48 that engages the at least one bracket 14 to absorb at least a portion of the impact force, when the glove box 22 is in the engaged position.

Referring to FIG. 8, a sixth transfer and absorption path for the impact force includes the trim panel 24 having at least one panel rib 44 formed thereon. When the impact force is applied to the glove box 22 at least a portion of the impact force is transferred through the at least one trim panel rib 44 to the instrument panel 16.

In one aspect, the at least one bracket 14 may be located according to one or more lower leg intrusion points. The lower leg intrusion points may represent the path that the knees of a typical passenger may take during a collision. The knees may travel in an arcing-motion as the legs rotate about the ankle towards the instrument panel 16. In the depicted embodiment, an energy absorbing bracket 14 can be securely attached to the IPR 12 at a first knee position, and a second energy absorbing bracket 14 can be securely attached to the IPR 12 at a second knee position.

The energy absorption system 10 described above can be configured to dissipate a portion of the energy applied to the instrument panel 16 and glove box 22 upon the application of an impact force such as from the knees of a passenger resulting from a collision.

With reference to FIG. 8, initially, the instrument panel 16 and glove box 22 is located in a position such that the trim panel 24 contact structure 48 is spaced at a distance d from the bracket 14 in an unengaged position. When a sufficient impact energy or force is applied to the glove box 22 and instrument panel 16, the glove box 22 moves in a direction corresponding to the arrow A such that the glove box 22 contacts the trim panel 24 and moves the trim panel 24 such that it traverses the distance d and is forced into an engagement position wherein it engages and contacts the bracket 14. Such a traversal operates to absorb a portion of the impact energy or force and transfer the force to the brackets 14. Additionally, the impact force is also dissipated and absorbed by the additional travel and absorption paths as described above.

Upon engagement, the bracket 14 may deflect or deform such that a portion of the impact energy is absorbed in a controlled manner. Either by deflection or deformation, the impact force is transferred to the brackets 14 and IPR 12.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

I claim:

1. An instrument panel and energy absorbing system for a vehicle comprising:
   an instrument panel reinforcement extending from a passenger side to a driver side of a vehicle;
   at least one bracket secured to the instrument panel reinforcement;
   a one piece instrument panel, the instrument panel including an open bin structure formed thereon;
   an opening formed in the instrument panel, the opening receiving a glove box structure;
   a trim panel connected to the instrument panel about the opening and open bin structure, the trim panel including a contact structure spaced from the at least one bracket in an unengaged position;
   wherein when an impact force is applied to the glove box, a glove box travels along a path from the unengaged position to an engaged position, and wherein the glove box contacts the trim panel transferring at least a portion of the impact force to the trim panel and wherein the trim panel moves and the contact structure contacts the at least one bracket to absorb at least a portion of the impact force, when the glove box is in the engaged position.

2. The instrument panel and energy absorbing system of claim 1 wherein the open bin structure includes a slot formed therein receiving a fastener connecting the open bin structure to the bracket wherein when the impact force is applied to the glove box at least a portion of the impact force is transferred through the open bin and fastener to the bracket.

3. The instrument panel and energy absorbing system of claim 1 wherein the trim panel includes a slot formed therein receiving a fastener connecting the trim panel to the instrument panel wherein when the impact force is applied to the glove box at least a portion of the impact force is transferred through the trim panel and fastener to the instrument panel.

4. The instrument panel and energy absorbing system of claim 1 wherein the trim panel includes at least one rib formed thereon wherein when the impact force is applied to the glove box at least a portion of the impact force is transferred through the at least one trim panel rib to the instrument panel.

5. The instrument panel and energy absorbing system of claim 1 wherein the instrument panel includes at least one rib formed thereon wherein when the impact force is applied to the glove box at least a portion of the impact force is transferred through the at least one instrument panel rib to the bracket.

6. The instrument panel and energy absorbing system of claim 1 wherein when the impact force is applied to the glove box, the instrument panel reinforcement and the bracket are configured to deform in order to absorb at least a portion of the impact force.

7. The instrument panel and energy absorbing system of claim 1 wherein the instrument panel includes at least one access window formed therein allowing connection of components on a rear side of the instrument panel.

8. The instrument panel and energy absorbing system of claim 1 further including a decorative trim panel disposed over the at least one access window.

9. The instrument panel and energy absorbing system of claim 1 wherein the instrument panel includes a box structure formed therein and positioned adjacent the at least one access window.

10. An instrument panel and energy absorbing system for a vehicle comprising:
    an instrument panel reinforcement extending from a passenger side to a driver side of a vehicle;
    at least one bracket secured to the instrument panel reinforcement;
    a one piece instrument panel, the instrument panel including an open bin structure formed thereon wherein the open bin structure includes a slot formed therein receiving a fastener connecting the open bin structure to the bracket;
    an opening formed in the instrument panel, the opening receiving a glove box structure;
    a trim panel connected to the instrument panel about the opening and open bin structure wherein the trim panel includes a slot formed therein receiving a fastener connecting the trim panel to the instrument panel, the trim panel including a contact structure spaced from the at least one bracket in an unengaged position;
    wherein when an impact force is applied to the glove box, the glove box travels along a path from the unengaged position to an engaged position, and wherein the trim panel moves and the contact structure contacts the at least one bracket and at least a portion of the impact force is transferred through the trim panel and fastener to the instrument panel and through the open bin and fastener to the bracket.

11. The instrument panel and energy absorbing system of claim 10 wherein the trim panel includes at least one rib formed thereon wherein when the impact force is applied to the glove box at least a portion of the impact force is transferred through the at least one trim panel rib to the instrument panel.

12. The instrument panel and energy absorbing system of claim 10 wherein the instrument panel includes at least one rib formed thereon wherein when the impact force is applied to the glove box at least a portion of the impact force is transferred through the at least one instrument panel rib to the bracket.

13. The instrument panel and energy absorbing system of claim 10 wherein when the impact force is applied to the glove box, the instrument panel reinforcement and the bracket are configured to deform in order to absorb at least a portion of the impact force.

14. An instrument panel and energy absorbing system for a vehicle comprising:
    an instrument panel reinforcement extending from a passenger side to a driver side of a vehicle;
    at least one bracket secured to the instrument panel reinforcement;
    a one piece instrument panel, the instrument panel including an open bin structure formed thereon and the instrument panel includes at least one rib formed thereon;
    an opening formed in the instrument panel, the opening receiving a glove box structure;
    a trim panel connected to the instrument panel about the opening and open bin structure wherein the trim panel includes at least one rib formed thereon, the trim panel including a contact structure spaced from the at least one bracket in an unengaged position;

wherein when an impact force is applied to the glove box, the glove box travels along a path from the unengaged position to an engaged position, and wherein at least a portion of the impact force is transferred through the at least one trim panel rib to the instrument panel and at least a portion of the impact force is transferred through the at least one instrument panel rib to the bracket.

15. The instrument panel and energy absorbing system of claim 14 wherein the open bin structure includes a slot formed therein receiving a fastener connecting the open bin structure to the bracket wherein when the impact force is applied to the glove box at least a portion of the impact force is transferred through the open bin and fastener to the bracket.

16. The instrument panel and energy absorbing system of claim 14 wherein the trim panel includes a slot formed therein receiving a fastener connecting the trim panel to the instrument panel wherein when the impact force is applied to the glove box at least a portion of the impact force is transferred through the trim panel and fastener to the instrument panel.

17. The instrument panel and energy absorbing system of claim 14 wherein when the impact force is applied to the glove box, the instrument panel reinforcement and the bracket are configured to deform in order to absorb at least a portion of the impact force.

\* \* \* \* \*